(12) United States Patent
Williams et al.

(10) Patent No.: US 8,503,523 B2
(45) Date of Patent: Aug. 6, 2013

(54) FORMING A REPRESENTATION OF A VIDEO ITEM AND USE THEREOF

(75) Inventors: Hugh E. Williams, Remond, WA (US); Xian-Sheng Hua, Beijing (CN); Hong-Qiao Li, Beijing (CN); Xiaodong Fan, Bellevue, WA (US); Richard Qian, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1282 days.

(21) Appl. No.: 11/772,101

(22) Filed: Jun. 29, 2007

(65) Prior Publication Data

US 2009/0007202 A1 Jan. 1, 2009

(51) Int. Cl.
*H04N 7/12* (2006.01)

(52) U.S. Cl.
USPC ............... 375/240.08; 375/240.09; 375/240.1

(58) Field of Classification Search
USPC .......................................................... 726/26
See application file for complete search history.

(56) References Cited

U.S. PATENT DOCUMENTS

| 5,903,892 A | 5/1999 | Hoffert et al. |
|---|---|---|
| 6,002,394 A | 12/1999 | Schein et al. |
| 6,072,934 A | 6/2000 | Abecassis |
| 6,388,688 B1 | 5/2002 | Schileru-Key |
| 6,535,639 B1 | 3/2003 | Uchihachi et al. |
| 6,792,615 B1 | 9/2004 | Rowe et al. |
| 6,880,171 B1 | 4/2005 | Ahmad et al. |
| 7,181,757 B1 | 2/2007 | Kim et al. |
| 7,194,701 B2 | 3/2007 | Stavely et al. |
| 7,281,220 B1 | 10/2007 | Rashkovskiy |
| 7,555,718 B2 | 6/2009 | Girgensohn et al. |
| 7,730,405 B2 | 6/2010 | Gulli et al. |
| 7,730,426 B2 | 6/2010 | Slawson et al. |
| 8,078,603 B1 | 12/2011 | Chandratillake et al. |
| 2002/0033848 A1 | 3/2002 | Sciammarella et al. |
| 2002/0069218 A1 | 6/2002 | Sull et al. |
| 2002/0180774 A1 | 12/2002 | Errico et al. |

(Continued)

FOREIGN PATENT DOCUMENTS

WO   WO2007046708 A1   4/2007

OTHER PUBLICATIONS

"Automatic Video Scene Extraction by Shot Grouping", in Proc. of ICPR 2000. Tong Lin; Hong-Jiang Zhang; Nat. Lab. of Machine Perception, Beijing Univ. This paper appears in: Pattern Recognition, 2000. Proceedings. 15th International Conference on; Issue Date: 2000; on pp. 39-42 vol. 4; Meeting Date: Sep. 2000.*

(Continued)

*Primary Examiner* — David Y Jung
(74) *Attorney, Agent, or Firm* — Lee & Hayes, PLLC (57) ABSTRACT

Functionality is described for forming a summary representation of a video item to help a user decide whether to obtain a full version of the video item. The functionality operates by: (a) receiving a video item; (b) dividing the video item into a plurality of segments; (c) extracting at least one key frame from each of the plurality of segments to form a plurality of key frames; and (d) organizing the video segments into one or more groups corresponding to one or more respective scenes based on the plurality of key frames, to thereby form the representation of the video item. The functionality can be used to communicate search results to a user, to provide a sample of the video item in a message, etc.

20 Claims, 9 Drawing Sheets

U.S. PATENT DOCUMENTS

| | | | |
|---|---|---|---|
| 2003/0033296 | A1 | 2/2003 | Rothmuller et al. |
| 2003/0061239 | A1 | 3/2003 | Yoon |
| 2003/0061612 | A1 | 3/2003 | Lee et al. |
| 2003/0117428 | A1 | 6/2003 | Li et al. |
| 2003/0122861 | A1* | 7/2003 | Jun et al. ................. 345/720 |
| 2003/0146939 | A1 | 8/2003 | Petropoulos et al. |
| 2003/0163815 | A1 | 8/2003 | Begeja et al. |
| 2003/0233929 | A1 | 12/2003 | Agnihotri |
| 2005/0058431 | A1 | 3/2005 | Jia et al. |
| 2005/0102324 | A1 | 5/2005 | Spring et al. |
| 2006/0026524 | A1 | 2/2006 | Ma et al. |
| 2006/0106764 | A1 | 5/2006 | Girgensohn et al. |
| 2006/0230334 | A1 | 10/2006 | Slawson et al. |
| 2006/0253436 | A1 | 11/2006 | Cook et al. |
| 2006/0256210 | A1 | 11/2006 | Ryall et al. |
| 2007/0046669 | A1 | 3/2007 | Choi et al. |
| 2007/0050251 | A1 | 3/2007 | Jain et al. |
| 2007/0088328 | A1 | 4/2007 | Melsheimer |
| 2007/0130159 | A1 | 6/2007 | Gulli et al. |
| 2007/0130203 | A1 | 6/2007 | Gulli et al. |
| 2007/0130602 | A1 | 6/2007 | Gulli et al. |
| 2007/0203942 | A1 | 8/2007 | Hua et al. |
| 2007/0203945 | A1 | 8/2007 | Louw |
| 2007/0204238 | A1 | 8/2007 | Hua et al. |
| 2007/0204310 | A1 | 8/2007 | Hua et al. |
| 2007/0244902 | A1 | 10/2007 | Seide et al. |
| 2007/0296863 | A1* | 12/2007 | Hwang et al. ................. 348/563 |
| 2008/0052630 | A1 | 2/2008 | Rosenbaum et al. |
| 2008/0066135 | A1 | 3/2008 | Brodersen et al. |
| 2008/0086688 | A1 | 4/2008 | Chandratillake et al. |
| 2009/0030991 | A1 | 1/2009 | Vakkalanka |
| 2009/0150784 | A1* | 6/2009 | Denney et al. ................. 715/722 |
| 2011/0029873 | A1* | 2/2011 | Eseanu et al. ................. 715/719 |
| 2011/0321084 | A1* | 12/2011 | Takahashi et al. ............. 725/32 |

OTHER PUBLICATIONS

Itti, L; Automatic foveation for video compression using a neurobiological model of visual attention; Image Processing, IEEE Transactions on; vol. 13, Issue: 10; Publication Year: 2004, pp. 1304-1318.*

Adcock et al., "Interactive Video Search Using Multilevel Indexing," retrieved at <<http://www.fxpal.com/publications/FXPAL -P R-05-320 .pdf>>, Lecture Notes in Computer Science, 2005, 10 pages.

Beek et al., "Content Description for Efficient Video Navigation, Browsing and Personalization," retrieved on Mar. 27, 2007, at <<http://csdl2.computer.org/persagen/DLAbsToc.jsp?resourcePath=/dl/proceedings&toc=comp/proceedings/cbaivl/2000/0695/00/0695toc.xml&DOI=10.1109/IVL.2000.853837>>, IEEE, 2000, pp. 1-2.

Girgensohn et al., "Locating Information in Video by Browsing and Searching," retrieved at <<http://www.fxpal.com/publications/FXPAL-PR-06-377.pdf>>, Signals and Communication Technology, 2006, 21 pages.

Ma et al., "A User Attention Model for Video Summarization," available at least as early as Mar. 26, 2007, at <<http://delivery.acm.org/10.1145/650000/641116/p533-ma.pdf?key1=641116&key2=5612984711&coll=GUIDE&dl=GUIDE&CFID=14511989&CFTOKEN=30069164>>, ACM, 2002, pp. 533-542.

Nam et al., "Dynamic Video Summarization and Visualization," available at least as early as Mar. 26, 2007, at <<http://delivery.acm.org/10.1145/320000/319892/p53-nam.pdf?key1=319892&key2=4109094711&coll=GUIDE&dl=GUIDE&CFID=14529047&CFTOKEN=44697748>>, ACM, 1999, pp. 53-56.

Niblack et al., "Web-Based Searching and Browsing of Multimedia Data," retrieved at <<http://ieeexplore.ieee.org/Xplore/ defdeny.jsp?url=/iel5/697 4/18858/008711 03.pdf&htry=3?code=18#>>, IEEE International Conference on Multimedia and Expo, Jul. 30-Aug. 2, 2000, 1 page.

Office Action from U.S. Appl. No. 11/952,908, mailed Oct. 4, 2011, Justin S. Denney, "User Interface for Previewing Video Items," 14 pages.

Office Action from U.S. Appl. No. 11/952,908, mailed Dec. 22, 2010, Justin S. Denney, "User Interface for Previewing Video Items," 11 pages.

"Web-based searching and browsing of multimedia data," retrieved on Mar. 27, 2007, at <<http://ieeexplore.ieee.org/Xplore/defdeny.jsp?url=/iel5/6974/18858/00871103.pdf&htry=3?code=18#>>, IEEE, 2006, 1 page.

Yahiaoui et al., "Automatic Video Summarization," retrieved at << http://www-rocq.inria.fr/imedia/ mmcbir2001FinalpaperMerialdo.pdf>>, 2001, 4 pages.

Office Action from U.S. Appl. No. 11/952,908, mailed Jun. 7, 2011, Justin S. Denney, "User Interface for Previewing Video Items," 17 pages.

Office Action from U.S. Appl. No. 11/952,908, mailed Feb. 21, 2012, Justin S. Denney, "User Interface for Previewing Video Items," 15 pages.

Office Action from U.S. Appl. No. 11/952,908, mailed Jun. 7, 2011, Justin S. Denney, "User Interface for Previewing Video Items," 12 pages.

Office Action for U.S. Appl. No. 11/952,908, mailed Mar. 29, 2013, Denney, et al., "User Interface for Previewing Video Items", 19 pages.

* cited by examiner

FORMING A REPRESENTATION OF A VIDEO ITEM AND USE THEREOF

BACKGROUND

Users may now readily receive various types of video items from network-accessible services and other data processing systems. In a typical case, a service may present a series of representative frames for respective available video items. A user can select one of these frames to play or download the corresponding video item.

One shortcoming of the above-described approach is that a representative frame may not accurately convey the contents of the corresponding video item. The user may click on the representative frame to watch the full video item. But this process may be time-consuming and cumbersome when the user desires to investigate many video items.

Many techniques exist for summarizing a video item by forming a condensed version of the video item. For example, one technique summarizes a video item by producing a fast-forward version of the video item. These techniques may have various shortcomings. For example, some of these techniques may produce an unsatisfactory user experience. Further, some techniques may not be ideally suited to quickly communicating the subject matter of the video item. For example, while certain techniques may condense an entire "story" conveyed by a video item, this may provide too much information to the user; this is especially the case where the intent of a service is to convey the basic nature of the video item without revealing its entire story line.

SUMMARY

Illustrative functionality is described for forming a summary representation of a video item to help a user decide whether to obtain a full version of the video item. The functionality operates by: (a) receiving a video item; (b) dividing the video item into a plurality of segments; (c) extracting at least one key frame from each of the plurality of segments to form a plurality of key frames; and (d) organizing the video segments into one or more groups corresponding to one or more respective scenes based on the plurality of key frames, to thereby form the summary representation of the video item.

The illustrative functionality can apply the thus-formed representation to various uses. In one case, the functionality operates by: (a) presenting a key frame associated with at least one scene of the video item; (b) receiving the user's selection of the key frame; and (c) presenting a video vignette in response to the user's selection of the key frame. The functionality can be used to communicate search results to a user, to provide a sample of a video item in a message to the user, and so on.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth illustrative functionality for forming a summary representation (or simply a "representation") of a video item. The disclosure also sets for various uses of the thus-formed summary representation. The functionality can be manifested in various systems, apparatuses, modules, procedures, storage mediums, data structures, and other forms.

The term "video item" refers to any video information of any length composed of a plurality of frames. The video information can include visual information and can optionally also include audio information. The summary representation of the video item refers to a condensed version of the video item.

This disclosure includes the following sections. Section A describes an illustrative procedure for forming a summary representation of a video item. Section B describes an illustrative system for implementing the procedure of Section A. Section C describes various illustrative applications of the summary representations produced according to the procedure of Section A.

As a preliminary note, any of the functions described with reference to the figures can be implemented using software, firmware, hardware (e.g., fixed logic circuitry), manual processing, or a combination of these implementations. The term "logic," "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Certain figures describe the approach in flow chart form. In this manner of explanation, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

A. Illustrative Procedure for Summarizing a Video Item

A.1. Overview of Procedure

Figure 1A:
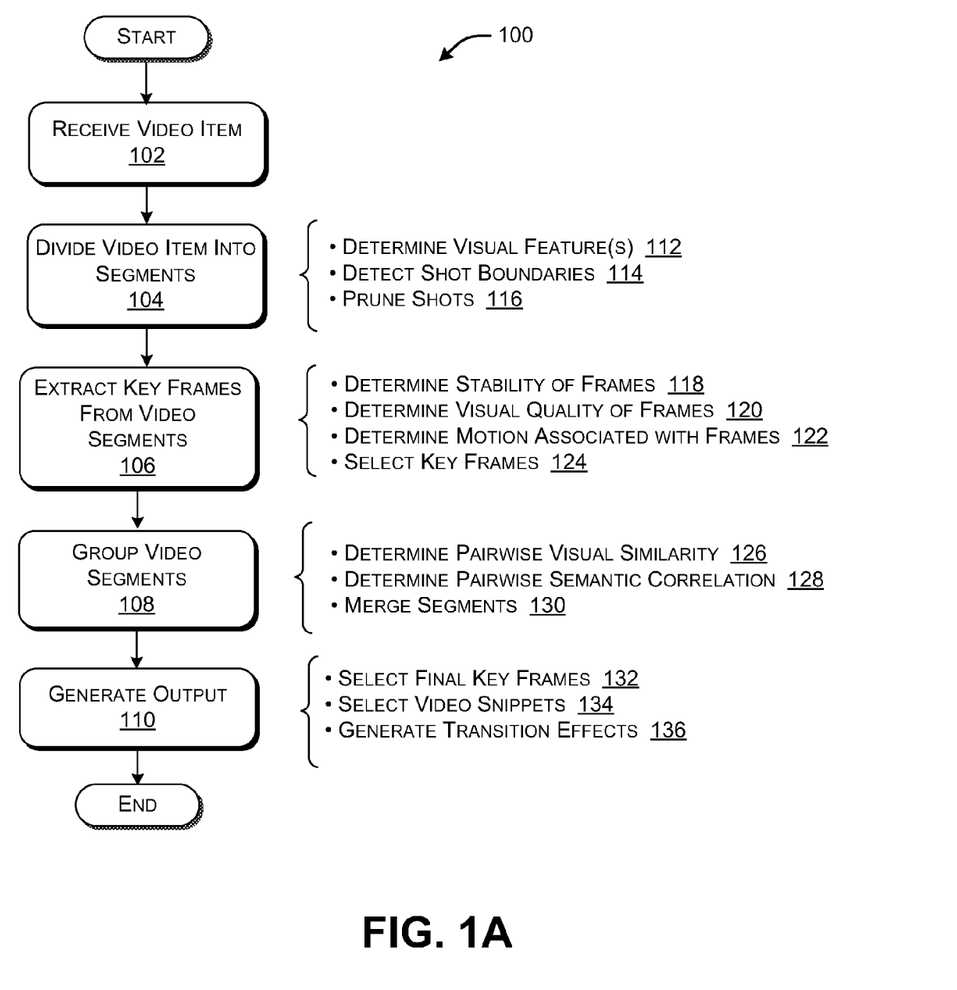
FIG. 1A is a flowchart which shows an illustrative procedure for forming a summary representation of a video item.

FIG. 1A is a flowchart which shows one illustrative procedure 100 for forming a summary representation of a video item. Section B will describe an illustrative system for implementing the procedure 100; but suffice it to say here that any data processing environment can be used to implement the procedure 100, including a local data processing environment (e.g., where the procedure 100 is performed entirely by a user processing device), a network data processing environment (e.g., where the procedure 100 is performed at least in part using network-accessible resources), and so on.

In block 102, the data processing environment receives a video item. As stated above, the video item comprises video information of any length. The video information, in turn, can include visual information and can optionally include audio information. The video information can be expressed in any format, e.g., WMV, MPEG2/4, etc. The video item is composed of a plurality of frames. Essentially, each frame provides a still image in a sequence of such images that comprise a motion sequence.

The video item may include a plurality of segments. Each segment may correspond to a motion sequence. In one case, each segment is demarcated by a start-recording event and a stop-recording event. For example, in a home video scenario, a user creates a segment by activating a start-recording command, capturing a video sequence of any duration, and then activating a stop-recording command.

The video item may also correspond to a plurality of scenes. The scenes may semantically correspond to different events captured by the video item. For example, as will be discussed below with reference to FIG. 2, the user may record a one hour video of a wedding. A first scene captures wedding guests preparing for the wedding. A second scene captures the wedding ceremony itself. A third scene captures the reception celebration following the wedding ceremony, and so forth. A single scene may include one or more segments.

In block 104, the data processing environment divides the video item into its plurality of constituent video segments.

In block 106, the data processing environment extracts at least one key frame from each video segment. The key frame serves as a representation of each video segment.

In block 108, based on the key frames extracted in block 106, the data processing environment groups the video segments into one or more groups. Each group of video segments may correspond to a scene within the video item.

In block 110, the data processing environment generates an output based on the preceding operations in blocks 102-108. In one case, for example, the data processing environment can select final key frames corresponding to each of the scenes identified in block 108. In addition, the data processing environment can generate a video vignette associated with each final key frame, e.g., comprising video information prior to and/or subsequent to the final key frame. As will be discussed in Section C, the data processing environment can present one or more final key frames to the user. When the use selects one of the key frames (e.g., by clicking on the key frame or mousing over the key frame, and so on), the data processing environment can play the corresponding video vignette for this frame. Or the data processing environment can respond to the user's activation of the key frame by playing all of the video vignettes associated with all of the key frames, optionally with transition effects smoothing the transition from one video vignette to the next video vignette. The key frames, in association with the corresponding video vignettes, form a representative summary of the video item.

The following description provides additional information regarding each of blocks 104, 106, 108, and 110. Section C provides additional information regarding various applications of summary representations of video items.

A.2. Block 104: Dividing the Video Item into Segments

As indicated above, block 104 involves dividing the video item into a plurality of video segments, where each video segment may be associated with a start-recording event and a stop-recording event. The general objective of block 104 is to produce video segments that which are: 1) non-trivial, in the sense that the segments are not too short in time duration; and 2) stable, motivated by the observation that stable segments usually have higher visual quality and are less likely to correspond to commercial content. Block 104 can include a number of component operations, described below.

In operation 112, the data processing environment can determine a visual feature associated with each frame of the video item. In one illustrative case, the visual feature for a particular frame relates to a manner in which a color (RGB) histogram of the frame varies with respect to at least one neighboring frame. Other implementations may use other types of holistic visual features to describe inter-frame variation.

In one illustrative and non-limiting case, an RGB histogram is used to compute the frame difference between the $i^{th}$ frame and the $1\text{-}1^{th}$ frame as:

$$D_i = 1 - \frac{\sum_j \min(H_i(j), H_{i-1}(j))}{W \times H},$$

where $H_i(j)$ is the value of the $j^{th}$ bin in the RGB histogram, W is the frame width, and H is the frame height.

In operation 114, the data processing environment uses the visual features computed in operation 112 to determine the boundaries between segments. In one case, for instance, the data processing environment can identify a boundary as a frame that has a visual feature that exceeds a predefined threshold. More generally stated, a segment boundary corresponds to a relatively large change between frames, indicative of a juncture at which the user has stopped recording and then later restarted recording.

In another illustrative case, a twin-threshold segment detection method (proposed by H. J. Zhang in "Automatic Partitioning of Full-Motion Video," Multimedia Systems, 1993) can be used to detect segment boundaries. "Twin-threshold" means two thresholds are used in this method. The first threshold is used to detect abrupt segment transition (also called cut). That is, a segment boundary is detected between two frames if the frame difference is larger than this threshold. The second threshold is used to detect gradual segment transition (such as wipe, fade, etc.). That is, when the frame difference is larger than the second threshold but less than the first threshold, the frame difference will be accumulated. A gradual segment transition is detected if the accumulated difference exceeds the first threshold; otherwise there is no segment boundary.

In addition to breaking the video item into segments, in one optional approach, segments are broken into sub-segments. The sub-segments can serve as basic editing units. In one technique, for instance, a segment is cut into two sub-segments at the local maximum if the local maximum's distances from the two segment boundaries are both not less than a minimal sub-segment length (e.g., 2 seconds in one illustrative case). Then, the above process is repeated until the lengths of all sub-segments are smaller than the maximum sub-segment length (e.g., 5 seconds in one illustrative case).

In operation 116, the data processing environment may remove one or more video segments that do not meet one or more prescribed criterion. For instance, the data processing environment can remove segments that have durations below a prescribed threshold. The data processing environment can also compute the stability of each segment, e.g., by averaging the frame histogram differences (between neighboring frames) within the segment. The data processing environment can then remove video segments that have stability values above a prescribed stability threshold. Segments that have high stability values are indicative of segments with rapid motion. These segments are more likely to have poor visual quality. Alternatively, or in addition, these segments may correspond to fast-moving commercials.

A.3. Block 106: Extracting Key Frames from the Video Segments

As indicated above, block 106 involves selecting a key frame representation for each segment. In one illustrative case, the general objective of this operation is to extract a key frame for each segment that: (a) is highly representative of the video segment; (b) has good visual quality; and (c) likely captures the intended subject matter of the video segment. Block 106 can include multiple operations, described below.

In operation 118, the data processing environment determines a frame stability feature for each frame. Generally, a frame stability feature measures a degree of inter-frame motion associated with a frame. More specifically, in one illustrative implementation, the frame stability feature relates to a manner in which a color histogram of a frame varies with respect to at least one neighboring frame. Generally, operation 118 can interpret frames that have rapid motion as unstable because these frames are more likely to have poor quality and are less representative of the content of the entire segment. More formally, in one illustrative case, the stability feature can be computed as $1-D_i$, where $D_i$ is the frame difference between the $i^{th}$ frame and the $i-1^{th}$ frame.

In operation 120, the data processing environment determines a frame visual quality feature for each frame. Generally, a frame visual quality feature measures the contrast of a frame image, which can be approximated by computing the entropy of the color histogram for the frame. A frame having relatively high entropy may correspond to a colorful image, which, in turn, is one factor indicating that the frame has good quality.

More formally, contrast can be computed as:

$$\text{Contrast} = -\frac{1}{N}\sum_{i=1}^{N} p_i \log(p_i) \text{ where } p_i = \frac{G(i)}{W \times X},$$

and where N is the bin count of the gray histogram and G(i) is the value of the $i^{th}$ bin. When the contrast of a frame is low, it means that the frame is too dark or too bright to see details in it.

In operation 122, the data processing environment can optionally determine a user attention feature for each frame. The user attention feature measures whether a frame likely captures the intended subject matter of the video segment, that is, whether the frame reflects the target of the video producer's interest or attention. The user attention feature can be approximated by determining the number of faces in a frame, the brightness of the frame, the amount of motion associated with the frame, and/or other factors. In some applications, operation 122 may be computationally intensive, and can therefore be optionally omitted from the image processing pipeline shown in FIG. 1A.

In operation 124, the data processing environment selects at least one key frame for each video segment based on one or more of the factors identified above, namely, the frame stability feature, the visual quality feature, and/or the user attention feature. That is, a score for each frame can be defined which combines all (or some) of the factors identified above. For example, in one illustrative and non-limiting case, a quality measure can be computed as: Quality=0.5×Contrast+0.5×Stability (where, in this illustrative case, the user attention feature is not used). The data processing environment can select a key frame within a segment corresponding to the frame with the highest score within the segment.

A.4. Block 108: Grouping Video Segments

As indicated above, block 108 involves grouping the video segments into one or more scenes based in part on the key frames produced in block 106. The general objective of operation 108 is to recursively group pairs of consecutive and semantically correlated segments. Block 108 can include multiple operations, summarized below.

Operation 126 involves forming a pairwise visual similarity feature. The purpose of this operation is to identify whether two video segments are visual similar, indicating that these segments may correspond to the same semantic scene. According to one illustrative approach, the data processing environment can form the pairwise visual similarity feature by measuring the color histogram difference between two corresponding key frames.

Operation 128 corresponds to forming a pairwise semantic correlation feature. The purpose of this operation is to identify whether two consecutive segments are semantically correlated. According to one illustrative approach, the data processing environment can form the pairwise semantic correlation feature by computing the correlation or mutual information shared between two color histograms of two corresponding key frames.

Operation 130 involves forming one or more groups of video segments corresponding to one or more semantic scenes. The data processing operation can perform this operation by computing a distance between every pair of consecutive segments based on the pairwise visual similarity feature and the pairwise semantic correlation feature. The data processing environment can then employ a clustering technique to group segments together into one or more groups based on the distance information. In one approach, the clustering technique can recursively merge neighboring segments into contiguous scenes. One clustering approach that can be used is single-link agglomerative clustering.

A.5. Block 110: Generating an Final Output

As described above, block 110 corresponds to generating a final output based on the operations performed in blocks 102-108. Block 110, in turn, may include various component operations, summarized below.

In operation 132, the data processing environment can select final key frames for each group produced in block 108. For example, assume that a group includes only one segment. In this case, the data processing environment can select the same key frame identified in block 106 to represent this group. In another case, assume that a group merges together multiple video segments. In this case, the data processing environment can select a key frame for the group that serves as the best representative for the group (where the same factors discussed above for block 106 can be used to determine the best representative).

In operation 134, the data processing environment can select video vignettes for each group. A vignette corresponds to a relatively short interval of video information taken from the complete video item, (e.g., 5 seconds in length, 10 seconds in length, 20 second in length, etc., although a vignette of any duration can be used). For example, the data processing environment can select a vignette of video information for each key frame, where the vignette includes the key frame as part thereof, as well as a series of frames prior to the key frame and a series of frames after the key frame.

In operation 136, the data processing environment can generate a transition effect between two consecutive video vignettes to produce a more visually appealing transition from one video vignette to the next. For example, the data processing environment can produce a fade out at the end of the one video vignette and a fade in at the beginning of the next consecutive video vignette.

The thus-produced summary representation of the video item comprises the series of key frames extracted from the video item, together with the series of video vignettes associated with the key frames. The summary representation can give the user a quick understanding of the nature of the full video item without requiring the user to watch the entire video item. At the same time, in one case, the summary representation does not necessarily semantically convey the entire "story line" of the video. The intent of the summary representation is to apprise the user of the basic nature of the video item so that the user can determine whether the item matches her interests, not to semantically reveal the complete story that the video item may convey.

Although not described above, the procedure 100 can also take into account audio features of the video item when generating a summary representation of the video item. For example, the data processing environment can select key frames and associated video vignettes that have interesting audio information (e.g., speech information, music information, etc.). The summarization procedure can also provide textual information which accompanies the key frames and video vignettes.

Figure 1B:
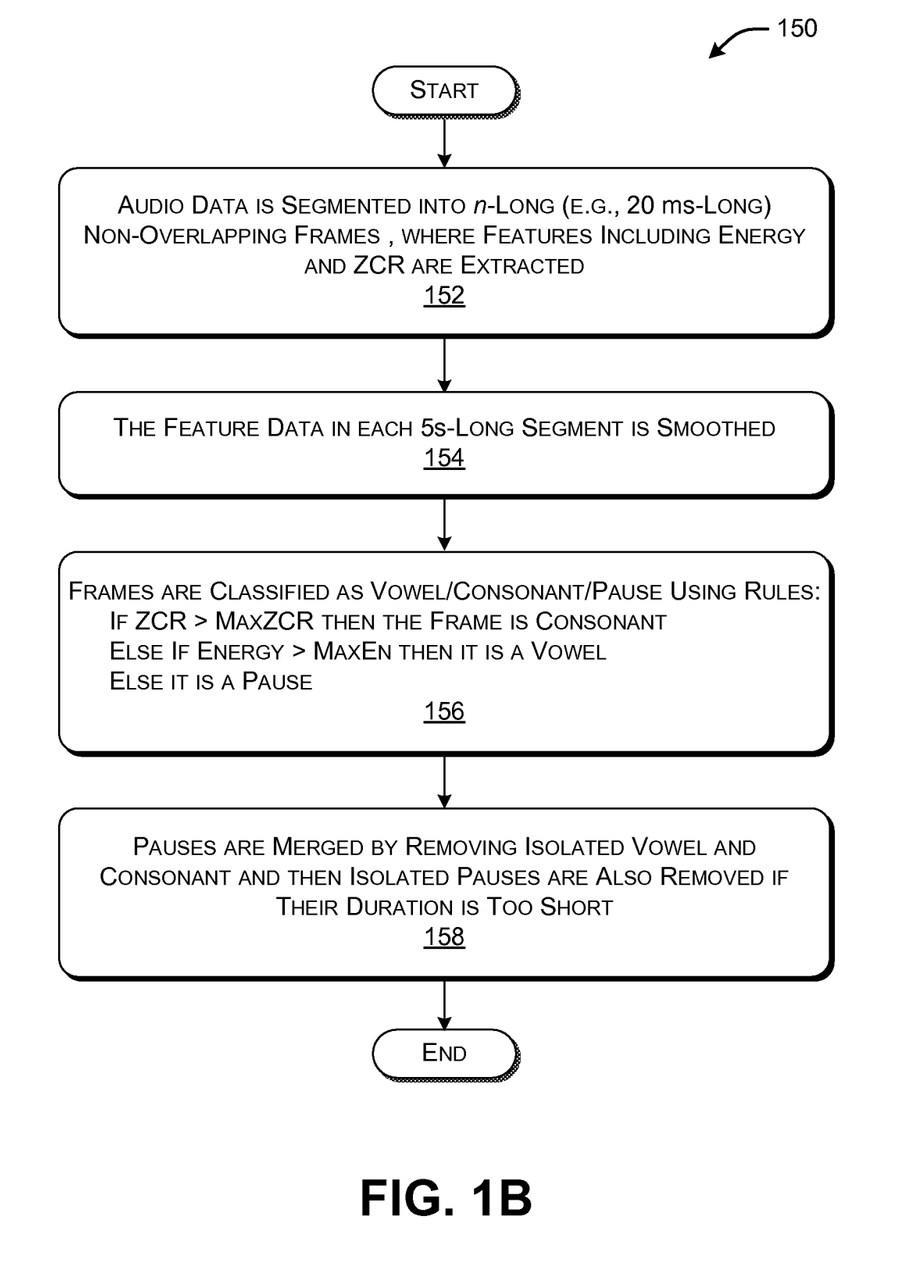
FIG. 1B is a flowchart which shows an illustrative procedure for detecting audio pauses.

The data processing environment can further select video vignettes that do not unnaturally truncate audio content in the video item. For example, FIG. 1B shows a procedure 150 for detecting audio pauses.

In operation 152, the data processing environment can segment audio into n-long non-overlapping frames, such as, in one illustrative case, 20 ms-long non-overlapping frames, where features including Energy and Zero Cross Rate (ZCR) are extracted, where:

$$\text{Energy} = \sqrt{\frac{1}{N}\sum_{i=1}^{N} s_i^2}, \text{ and}$$

$$ZCR = \frac{1}{2N}\sum_{i=2}^{N} |\text{sign}(s_i) - \text{sign}(s_i - 1)|,$$

where $s_i$ is the $i^{th}$ value of the PCM samples in a 20 ms-long non-overlapping frame and N is the total sample number.

In operation 154, the data processing environment can smooth the feature data in each 5s-long segment.

In operation 156, the data processing environment can classify the frames as corresponding to a vowel, consonant, or pause according to various rules. According to one rule, if ZCR is greater than a MaxZCR value, then the frame is determined to correspond to a consonant. According to another rule, if Energy is greater than a MaxEn value, then the frame is determined to correspond to a vowel. In another rule, if the above two rules do not apply, then the frame is determined to correspond to a pause.

In operation 158, the data processing environment can merge pauses by removing isolated vowels and consonants. Then, isolated pauses are also removed if their duration is too short.

The output of procedure 150 is a determination of pauses in the audio. As noted above, the data processing environment can use the output of this procedure 150 to prevent the video item from being broken up in the middle of speech, such as in the middle of spoken words, sentences, etc.

A.6. Example

Figure 2:
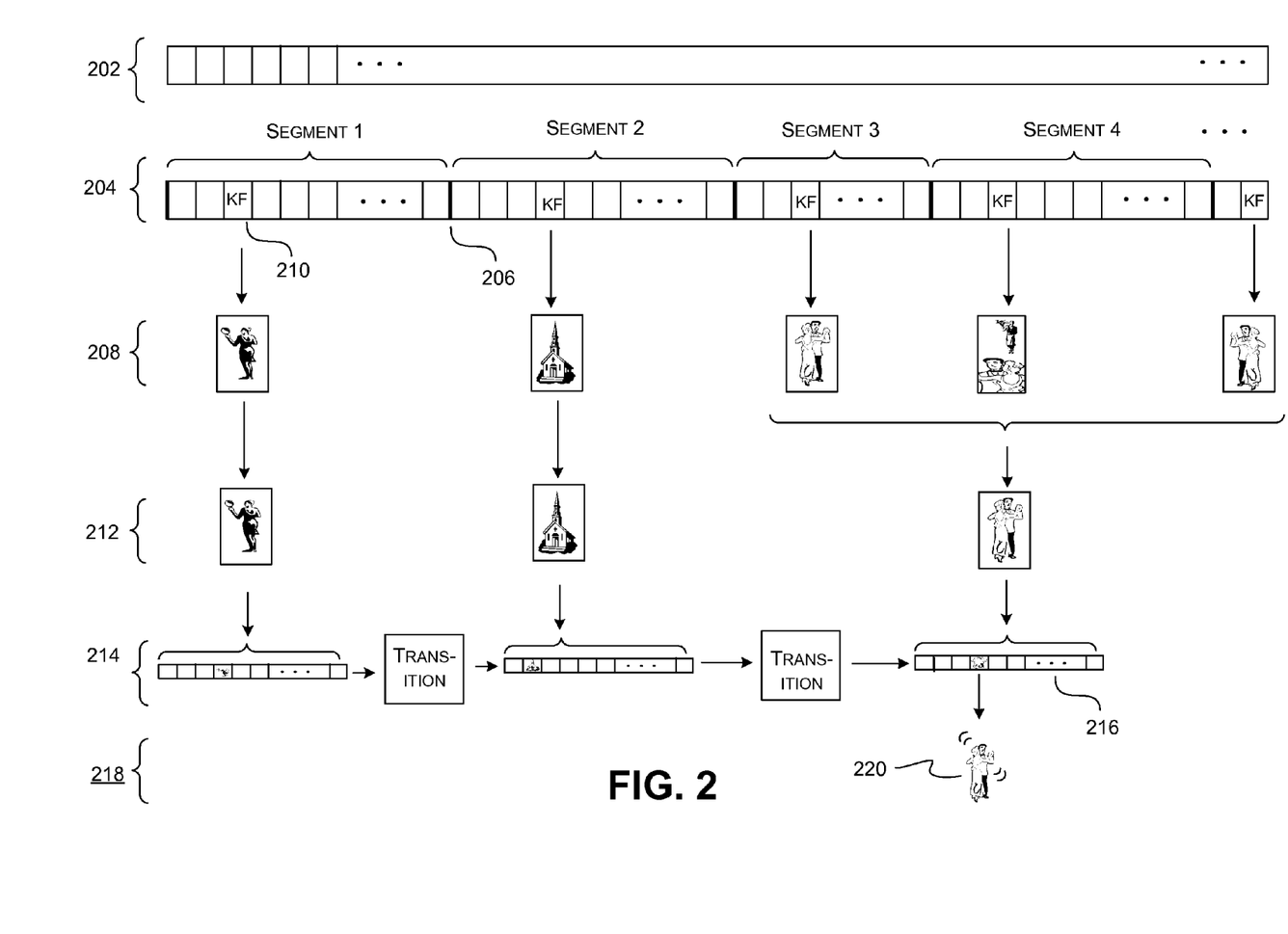
FIG. 2 is a graphical depiction of one example of the application of the procedure of FIGS. 1A and 1B.

FIG. 2 shows an example of the operation of the procedure 100 of FIGS. 1A and 1B. In this example, assume that the user has taken an hour-long video of a wedding. The user has captured three principal scenes in the course of the hour video. A first scene corresponds to one or mores segments of the guests preparing for the wedding. A second scene corresponds to one or more segments taken from the wedding ceremony itself. A third scene corresponds to one or more segments taken from the reception celebration following the ceremony. Of course, the video item can include fewer scenes and segments, or additional scenes and segments.

In phase 202 (corresponding to block 102), the data processing environment receives the original unprocessed video item. The video item includes a number of frames.

In phase 204 (corresponding to block 104), the data processing environment divides the video item into a series of consecutive segments. Line 206 represents an illustrative boundary between two consecutive segments In phase 208 (corresponding to block 106), the data processing environment selects a key frame from each segment. For example, the data processing environment selects a key frame 210 from the first video segment.

In phase 212 (corresponding to block 108), the data processing environment groups together various segments corresponding to the same semantic scene. For example, the data processing environment combines together the last three segments into a single scene. This scene generally captures guests dancing at the reception.

In phases 212 and 214 (corresponding to block 110), the data processing environment selects final key frames associated with each scene. For example, the data processing environment selects the best key frame from the multiple reception segments to represent the reception scene. Then, the data processing environment can select video vignettes that encompass each of the finally selected key frames. For example, video sequence 216 corresponds to a 10 second video vignette that includes a selected key frame in the reception scene.

In phase 218, assume that the user has selected the video vignette 216. This causes the data processing environment to play the vignette 216, or optionally play all of the vignettes in succession. Section C provides additional information regarding the application of the summary representation produced in the manner described in this section.

B. Illustrative System

Figure 3:
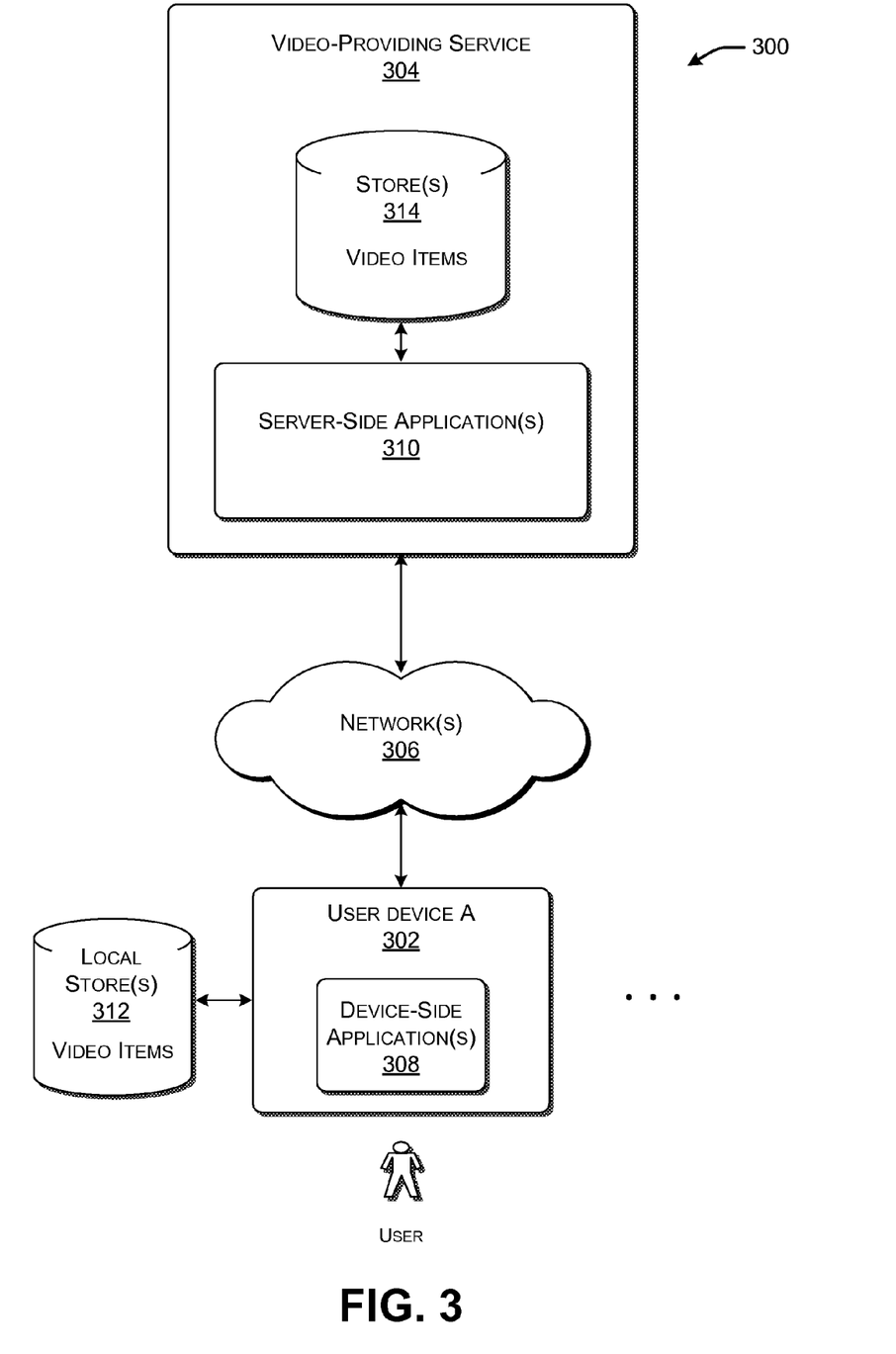
FIG. 3 shows one illustrative system that can be used to implement the procedure of FIGS. 1A and 1B.
Figure 4:
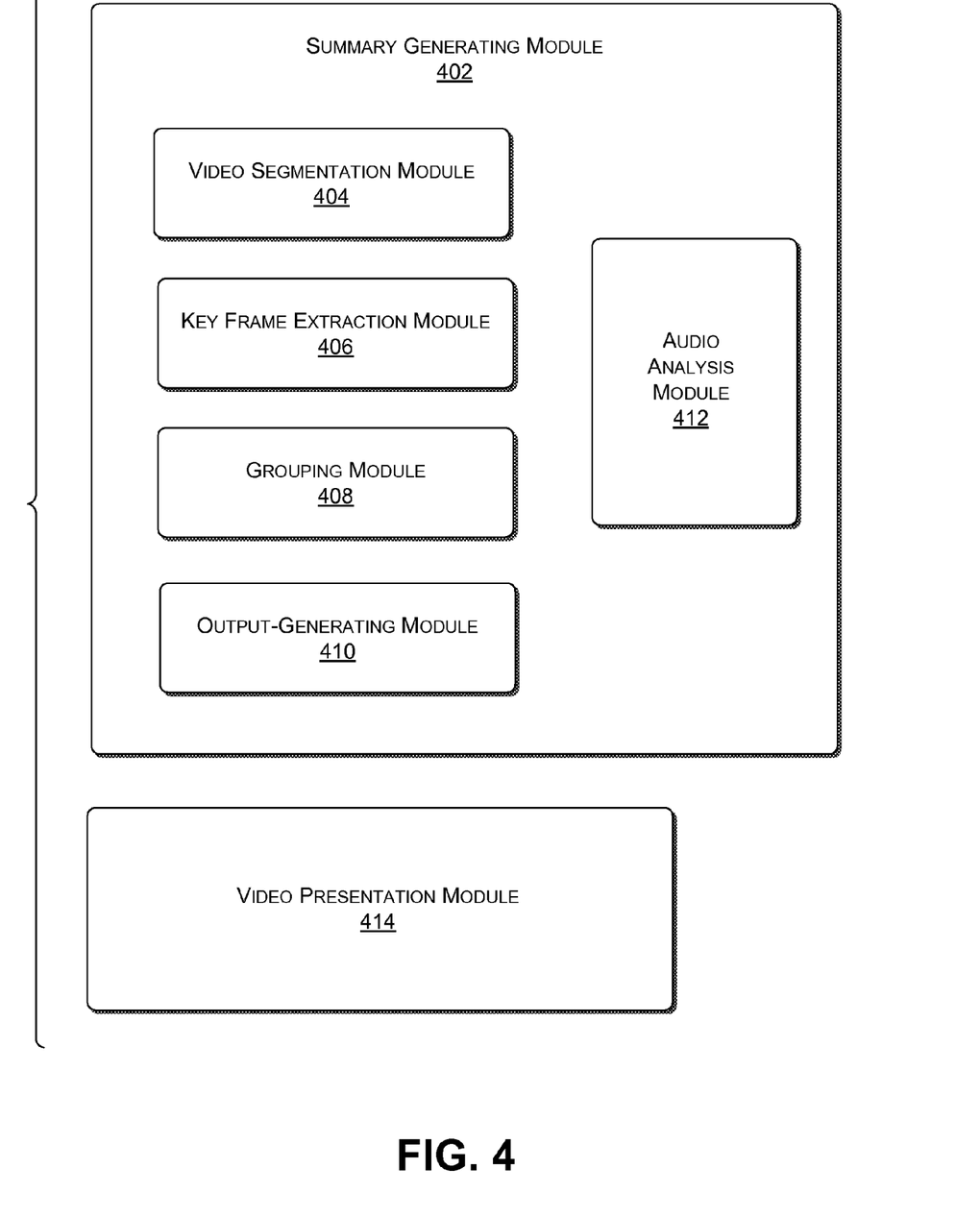
FIG. 4 shows a summary generation module that can be used to implement the procedure of FIGS. 1A and 1B, together with a video presentation module.
Figure 5:
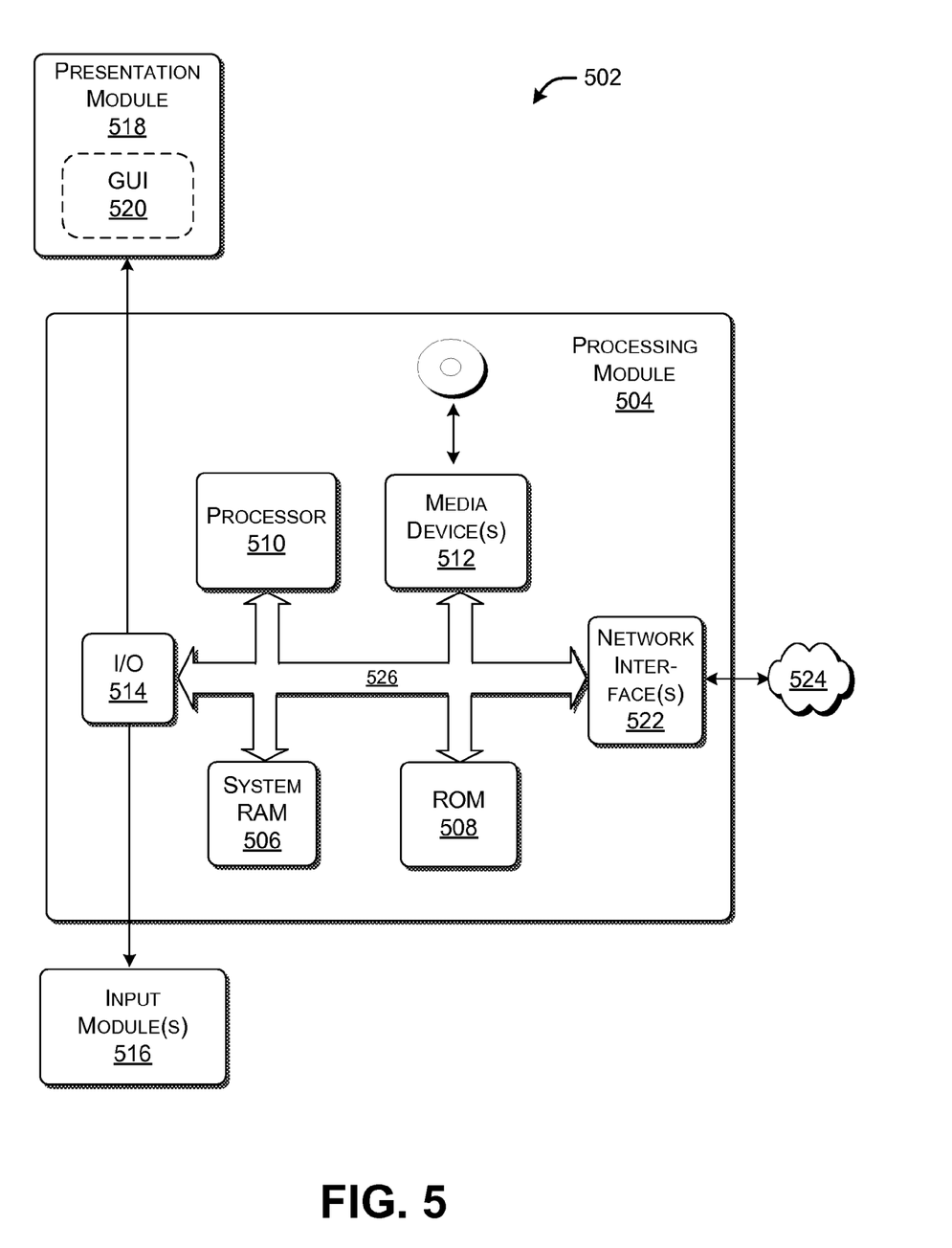
FIG. 5 shows illustrative processing functionality that can be used to implement any aspect of the system of FIG. 3.

FIGS. 3-5 provide information regarding one implementation of the procedure 100 described in Section A.

Starting with FIG. 3, this figure shows a data processing environment 300 that includes a user device 302 coupled to a video-providing service 304 via one or more networks 306. The user device 302 can correspond to any type of data processing device, such as a personal computer, lap top computer, personal digital assistant (PDA) device, mobile telephone device, game console device, set-top box device, and so forth. The video-providing service 304 can correspond to one or more server-type computers, data stores, and/or other data processing equipment. The network(s) 306 can represent a local area network (LAN), a wide area network (WAN) (e.g., the Internet), or some combination of LAN(s) and WAN(s). The network(s) 306 can be implemented by any combination of wireless links, hardwired links, routers, gateways, name servers, and so forth, and can be governed by any protocol or combination of protocols.

The user device 302 can include one or more device-side applications 308. The video-providing service 304 can include one or more server-side applications 310. Further, the user device 302 can include one or more local stores 312 for retaining video items, summary representations, and/or other information. Similarly, the vide-providing service 304 can include one or more stores 314 for retaining video items, summary representations, and/other information.

Advancing to FIG. 4, this figure shows a summary generation module 402 which performs the procedure 100 shown in FIGS. 1A and 1B. Namely, the summary generation module 402 includes a video segmentation module 404 for segmenting a video item into multiple segments, thus implementing block 104 of FIGS. 1A and 1B. The summary generation module 402 includes a key frame extraction module 406 for selecting at least one key frame for each video segment, thus implementing block 106 of FIGS. 1A and 1B. The summary generation module 402 includes a grouping module for grouping video segments into semantic scenes, thus implementing block 108 of FIGS. 1A and 1B. The summary generation module 402 includes an output-generating module 410 for selecting final key frames and associated video vignettes, thus implementing block 110 of FIGS. 1A and 1B. The summary generation module 402 also includes an audio analysis module 412 for analyzing the audio component of the video item, e.g., to detect pauses according to the procedure of FIG. 1B, and so forth.

FIG. 4 also shows a video presentation module 414. The purpose of this module 414 is to present the summary representation produced by the summary generation module 402. This may involve presenting the key frames to a user in response to various triggering events. The video presentation operation may also involve presenting one or more video vignettes in response to various triggering events. Additional information regarding the presentation of summary representations is set forth in Section C below.

Now referring to both FIGS. 3 and 4, the summary generation module 402 and the video presentation module 414 can be implemented by the data processing environment 300 in various ways. In one local implementation, the user device 302 may receive a video item from the local store(s) 312 and/or the service store(s) 314. The user device 302 can then rely on its local application(s) 308 to generate the summary representation and/or to present the resultant summary presentation.

In a network implementation, user device 302 can rely on the server-side application(s) 310 to produce the summary representation of a video item (which may be obtained from the local store(s) 312 and/or the service store(s) 314). The user device 302 can also rely on the server side application(s) 310 to present the summary representation and/or it can rely on its local application(s) to perform this task.

To cite one example of the network implementation, a user may use the user device 302 to forward a search query to the video-processing service 304. A search application at the video-providing server 304 can form search results in response to the query. The search results may identify a plurality of video items by respective key frames associated with the video items. The search application at the video-providing service can then receive the user's activation of one of the key frames in the search results, causing the search application to present a video vignette associated with the selected key frame. In an alternative case, the video-presentation service 304 can embed video vignettes into the search results that it provides to the user device 302. When the user activates a particular key frame, a device-side application can play a corresponding video vignette which it has already stored in its local memory.

Still other applications of the summary generation module 402 and the video presentation module 414 are possible.

Advancing to FIG. 5, this figure sets forth illustrative processing functionality 502 that can be used to implement any aspect of system 300 shown in FIG. 3. In one non-limiting case, for instance, the processing functionality 502 may represent any computer machine used by the system 300, e.g., to implement any aspect of the user device 302 and/or any aspect of the video-providing service 304, and so on.

The processing functionality 502 can include a processing module 504 for implementing various processing functions. The processing module 504 can include volatile and non-volatile memory, such as RAM 506 and ROM 508, as well as one or more processors 510. The processing functionality 502 can perform various operations identified above when the processor(s) 510 executes instructions that are maintained by memory (e.g., 506, 508, or elsewhere). The processing functionality 502 also optionally includes various media devices 512, such as a hard disk module, an optical disk module, and so forth.

The processing functionality 502 also includes an input/output module 514 for receiving various inputs from the user (via input module 516), and for providing various outputs to the user (via presentation module 518). The presentation module 518 can provide a graphical user interface (GUI) 520. The processing functionality 502 can also include one or more network interfaces 522 for exchanging data with other devices and systems via one or more communication conduits 524. One or more communication buses 526 communicatively couple the above-described components together.

C. Illustrative Applications

C.1. General Procedure for Presenting a Summary Representation

Figure 6:
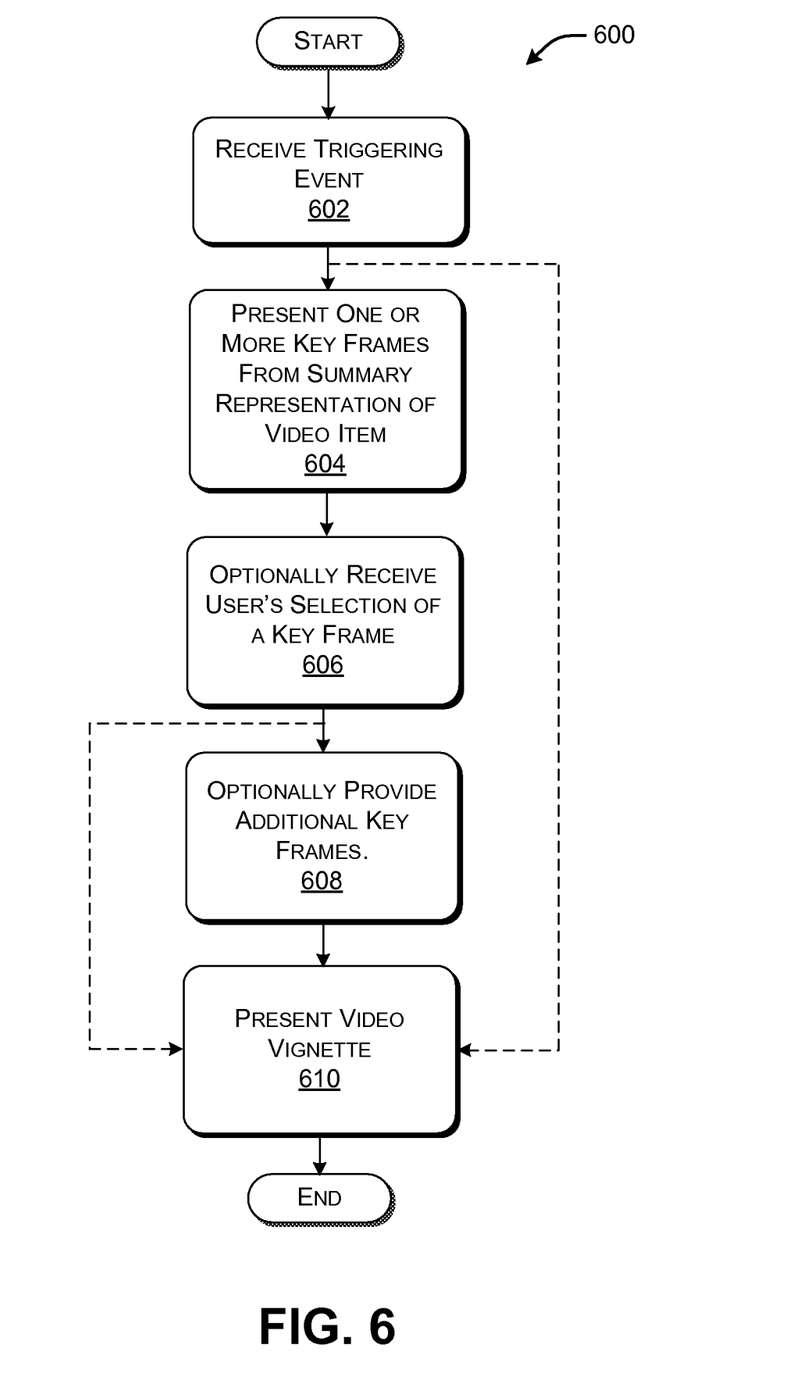
FIG. 6 is a flowchart which shows an illustrative procedure for applying the summary representations formed by the procedure of FIGS. 1A and 1B.

FIG. 6 is a flowchart which shows one illustrative procedure 600 for presenting a summary representation of a video item produced in the manner described in Section A.

In block 602, the data processing environment receives an event which triggers the presentation of the summary representation. The event may correspond to the user's input of a search query, a user sending another user a message that makes reference to a video item, and so on.

In block 604, the data processing environment can present one or more key frames associated with a featured video item. For example, in response to the user's input of a search query, the data processing environment can present a key frame associated with a video item that matches the user's search query.

In block 606, the data processing environment receives the user's selection of the key frame, e.g., in response to the user clicking on the key frame, mousing over the key frame, and so on.

In block 608, in response the user's selection, the data processing environment can optionally present additional key frames for the user's consideration. For example, assume that the initial key frame corresponds to the most representative key frame selected from the entire video item. If the user selects on this key frame, the data processing environment can present additional key frames corresponding to individual scenes within the video item.

In block 610, the data processing environment can present a video vignette provided by the summary representation. The vignette that is presented may correspond to only one of multiple vignettes provided by the summary representation. Or the vignette can piece together multiple vignettes associated with different scenes.

In one case, the data processing environment can present this vignette in response to the user's selection of a key frame upon the user being presented with additional key frames (in block 608). In another case, the data processing environment can present the vignette in response the user's selection of the originally presented key frame (in block 604), thus optionally omitting the presentation of the additional key frames (in block 608). In still another case, the data processing environment can present the vignette in response to the triggering event (in block 602), that is, without presenting any of the key frames (in blocks 604 and 608).

C.2. Search Application

Figure 7:
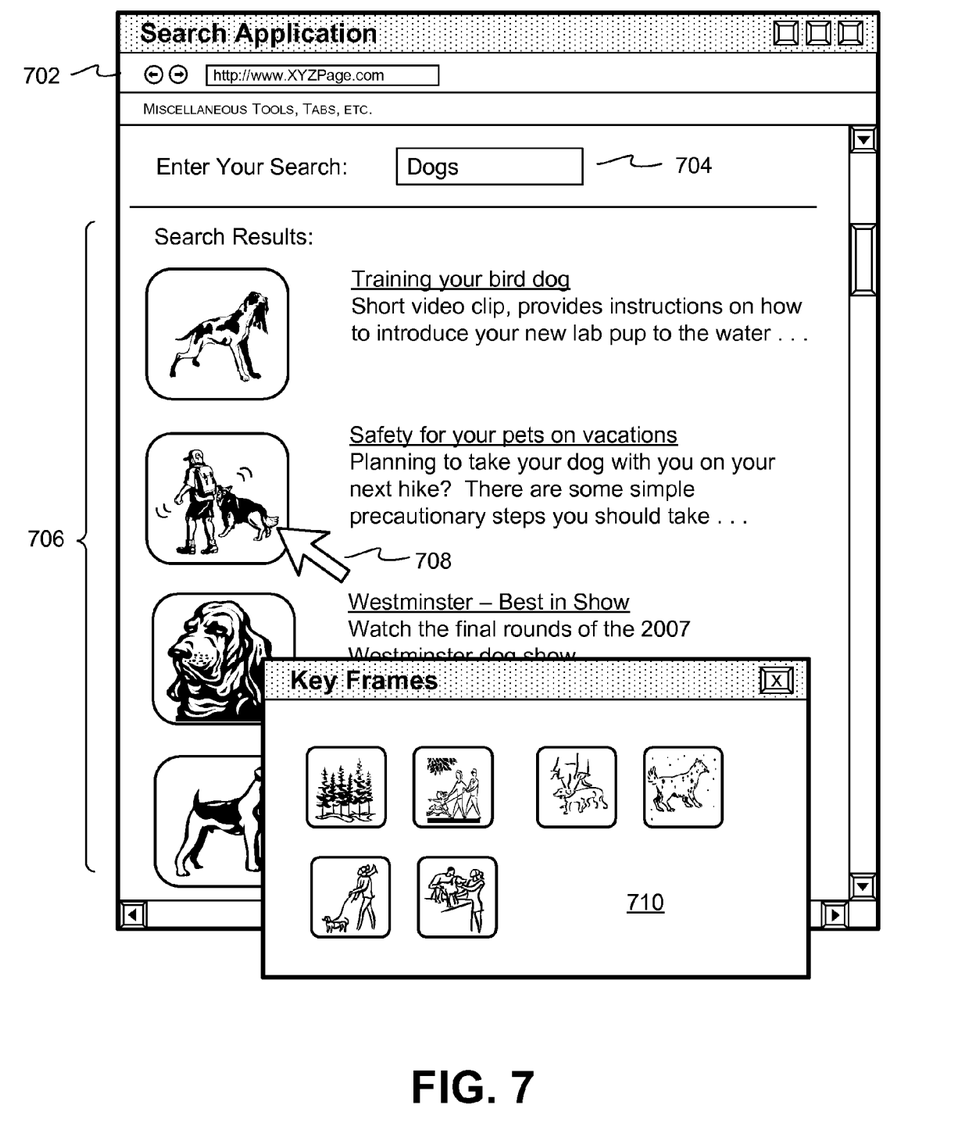
FIG. 7 shows an illustrative search application that uses summary representations formed by the procedure of FIGS. 1A and 1B.

The procedure 600 of FIG. 6 can be applied to various uses. FIG. 7 shows a user interface presentation 702, illustrating how the procedure 600 can be applied to a search-related application.

In this illustrative scenario, assume that the user enters a search query "dog" into a search portion 704 of the interface. The data processing environment can respond by presenting a series of search results in a results portion 706 of the interface. Each entry in the search result corresponds to a key frame of a corresponding video item relating to the theme of dogs.

Assume next that the user selects the second (from the top) key frame, corresponding to a video item that provides information regarding taking a pet on a vacation. The user may select the key frame by pointing to and clicking on the key frame using a mouse, or by simply mousing over the key frame, and so on. In one illustrative case, this prompts the data processing environment to invoke a video vignette associated with the selected key frame. The vignette may correspond to only one of the vignettes associated with the video item or may correspond to several vignettes pieced together to form a compilation-type summary.

In another case, the user's selection of the key frame prompts the data processing module to present a panel 710 that provides additional key frames selected from the video item. These additional key frames may correspond to respective scenes within the video item. The user may select any frame in the main interface presentation 706 or the panel 710 to invoke a video vignette associated with the selected key frame. The vignette may correspond to only one of the vignettes associated with the video item or may correspond to several vignettes pieced together to form a compilation-type summary.

In another implementation, the data processing environment can play one or more vignettes immediately upon serving the user interface presentation 702 to the user, that is, without first presenting static key frames in the manner shown.

In any event, the key frames and video vignettes convey the gist of the video items featured in the user interface presentation 702. Based on this information, the user may decide whether he or she wishes to obtain full versions of any video items identified in the user interface presentation 702. The user interface presentation 702 can also include textual information associated with each search result item to help the user make a decision.

C.3. Message-Related Application

Figure 8:
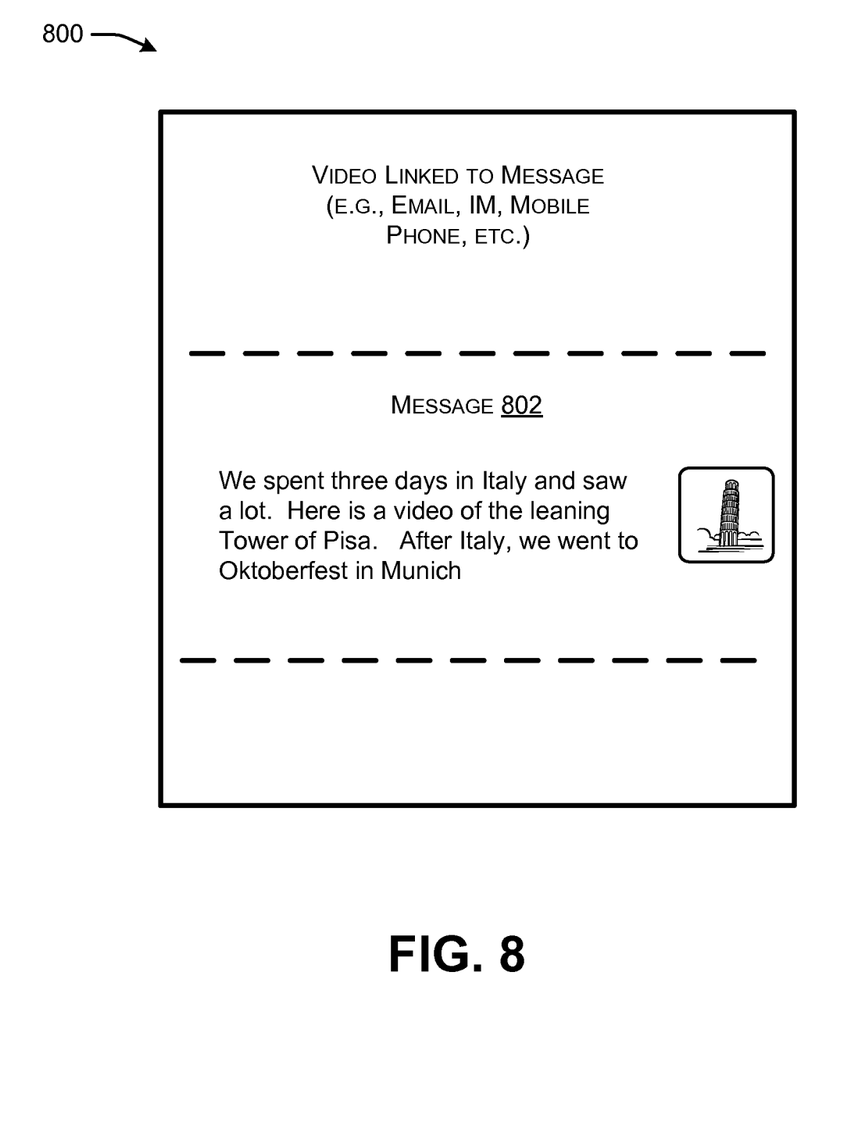
FIG. 8 shows an illustration messaging application that uses summary representations formed by the procedure of FIGS. 1A and 1B.

FIG. 8 shows another application of the summary representation. In this case, a first user has sent a message to a second user. The first user has associated a key frame with the message, e.g., as an embedded part of the message, an attachment to the message, and so on. The key frame corresponds to a video item that is related to a topic of discussion between the first user and the second user.

Upon receipt of the message, the second user can activate the key frame in the manner described above to receive additional key frames or a presentation of a video vignette corresponding to the selected key frame (in the same manner described above for the search-related user interface presentation 702). Based on the key frame information and the video vignette, the second user can decide whether he or she wishes to obtain the full item from the first user.

In one case, the message corresponds to an Email message that is transmitted between Email users. In another case, the message corresponds to an Instant Messaging (IM) message that is transmitted between IM users. In another case, the message corresponds to a message that is transmitted to a mobile telephone, and so on.

C.4. Feed Application

In another application, the data processing environment can present at least one key frame as part of a feed that is supplied to a user device (e.g., in response to the user's subscription to this feed). The user may activate any key frame in the feed to receive a video vignette of the corresponding video item. From this information, the user may decide whether he wishes to download the entire video item.

In any application, the summary representation can include metadata that describes the summary representation. For instance, some of the metadata can describe various characteristics of the video item. Other parts of the metadata may describe the manner in which the video item can be presented and other functional features. A recipient device can use the metadata to display information regarding the video item. Further the recipient device can use the metadata to determine the manner in which it will present the summary representation (if, in fact, the recipient device is even capable of presenting the summary representation).

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for forming a representation of a video item, comprising:
   receiving a video item;
   dividing the video item into a plurality of segments;
   extracting a key frame from each of the plurality of segments to form a plurality of key frames based on an user attention feature of each frame in the plurality of segments, each user attention feature is determined based on a quantity of face images present in a corresponding frame, each key frame serving as a representation of a video segment from the plurality of segments; and
   organizing the plurality of segments into one or more groups corresponding to one or more respective scenes based at least on the plurality of key frames;
   identifying a final key frame from the plurality of key frames for each of the one or more groups; and
   correlating a video vignette with each of the identified final key frames.

2. The method of claim 1, wherein each of the plurality of segments corresponds to a portion of the video item demarcated by a camera start-recording event and a camera stop-recording event.

3. The method of claim 1, wherein the dividing of the video item into a plurality of segments comprises:
   determining a visual feature for each frame of the video item; and
   detecting boundaries of the segments based on the visual feature.

4. The method of claim 3, wherein the visual feature relates to a manner in which a color histogram of a frame varies with respect to at least one neighboring frame.

5. The method of claim 1, wherein the dividing of the video item into a plurality of segments comprises:
   determining at least one video segment that does not meet at least one prescribed criterion; and
   omitting said at least one video segment.

6. The method of claim 1, wherein the extracting the key frame for each of the video segments comprises, for a particular video segment:
   determining a frame stability feature for each frame in the particular video segment, the frame stability of a frame in the particular video segment is determined by averaging a color histogram difference between neighboring frames within the particular video segment;
   determining a frame visual quality feature for each frame in the particular video segment, the frame visual quality of the frame in the particular video segment frame is computed based on an entropy of the color histogram for the frame; and
   selecting a corresponding key frame for the particular video segment based on the frame stability feature, the visual quality feature, and the user attention feature of each frame in the particular video segment.

7. The method of claim 6, wherein the frame stability feature relates to a manner in which a color histogram of a single frame varies with respect to at least one single neighboring frame.

8. The method of claim 6, wherein the frame visual quality feature of the frame in the particular video segment measures a contrast of the frame.

9. The method of claim 6, wherein the user attention feature of the frame reflects a relative importance of subject matter in the frame to a user.

10. The method of claim 1, wherein the organizing comprises:
    forming a pairwise visual similarity feature for each pair of key frames, wherein the pairwise visual similarity feature reflects a measure of visual similarity between the pair of key frames;
    forming a pairwise semantic correlation feature for each pair of key frames, wherein the pairwise semantic correlation feature reflects a measure of correlation between the pair of key frames;
    determining a distance between each pair of consecutive videos segments based on the pairwise visual similarity feature and the pairwise semantic correlation feature, to thereby produce distance information; and
    organizing the video segments into said one or more groups based on the distance information.

11. The method of claim 10, wherein the pairwise visual similarity feature relates to a manner in which a color histogram of a key frame varies with respect to another key frame.

12. The method of claim 10, wherein the pairwise semantic correlation feature relates to a manner in which a color histogram of a key frame is correlated to a color histogram of another key frame.

13. The method of claim 1, further comprising selecting the video vignette from each of the one or more groups, the video vignette comprising a portion of video taken from the video item.

14. One or more machine-readable media containing machine-readable instructions for implementing the method of claim 1.

15. One or more computing devices, comprising:
    one or more processors; and
    memory to store computer-executable instructions that, when executed by the one or more processors, perform the method of claim 1.

16. A method comprising:
    presenting a representation of a video item comprising one or more final key frames, wherein each or the one or more final key frames is identified by:
    receiving the video item;

dividing the video item into a plurality of segments based on visual features of multiple frames in the video item and audio features associated with the multiple frames of the video item;

extracting a key frame from each of the plurality of segments to form one or more key frames based on an user attention feature of each frame in the plurality of segments, each user attention feature is determined based on a quantity of face images present in a corresponding frame, a brightness of the corresponding frame, and an amount of motion in the corresponding frame, each key frame serving as a representation of a video segment from the plurality of segments;

organizing the plurality of segments into one or more groups corresponding to one or more respective scenes based on the one or more key frames;

identifying a final key frame from the one or more key frames for each of the one or more groups; and correlating a video vignette with each of the identified final key frames;

receiving a selection of a final key frame by a user; and presenting the video vignette correlated with the selected final key frame in response to the selection of the final key frame by the user, wherein the video vignette is selected to give the user information to make a decision as to whether to receive all of the video item.

17. The method of claim 16, further comprising receiving a search selection from the user, wherein the final key frame is presented to the user in response to a receipt of the search selection.

18. The method of claim 16, further comprising:

in response to the user's selection of the final key frame, presenting additional key frames associated with additional respective scenes of the video item; and receiving the user's selection of an additional key frame, wherein the video vignette is presented in response to the user's selection of the additional key frame.

19. The method of claim 16, wherein the final key frame is presented in a message received from another user.

20. A system comprising:

an audio analysis module that classifies each frame of a video item, based at least on audio features of each frame of the video item, as corresponding to a vowel, a consonant, or a pause;

a video segmentation module that divides the video item into a plurality of segments at a frame that corresponds to a pause;

a key frame extraction module that extracts a key frame from each of the plurality of segments to form a plurality of key frames, the key frame serving as a representation of the video segment from which it is extracted;

a grouping module that organizes the video segments into one or more groups corresponding to one or more respective scenes based on the plurality of key frames, to thereby form the representation of the video item;

an output generating module that correlates a video vignette with each key frame; and a video presentation module that presents each video vignette to a user in response to receipt of a user selection of one of the key frames that is correlated with the video vignette.

* * * * *